(12) United States Patent
Liao

(10) Patent No.: US 7,268,850 B2
(45) Date of Patent: Sep. 11, 2007

(54) SEALANT ENCASED BLOCKER FOR LCD OR LCOS PANEL

(75) Inventor: Bing-Jei Liao, Pingtung (TW)

(73) Assignee: Himax Technologies Limited, Tainan County (TW)

( * ) Notice: Subject to any disclaimer, the term of this patent is extended or adjusted under 35 U.S.C. 154(b) by 0 days.

(21) Appl. No.: 10/167,421

(22) Filed: Jun. 13, 2002

(65) Prior Publication Data

US 2002/0191141 A1 Dec. 19, 2002

(30) Foreign Application Priority Data

Jun. 14, 2001 (TW) .............................. 90114488 A

(51) Int. Cl.
*G02F 1/1339* (2006.01)
(52) U.S. Cl. .................... 349/153; 349/155; 349/156
(58) Field of Classification Search ................ 349/155, 349/156, 153
See application file for complete search history.

(56) References Cited

U.S. PATENT DOCUMENTS

| | | | |
|---|---|---|---|
| 5,229,232 A | | 7/1993 | Longobardi et al. |
| 5,459,598 A | * | 10/1995 | Carrington .................. 349/156 |
| 5,556,670 A | * | 9/1996 | Mihara et al. ............... 428/1.5 |
| 5,831,710 A | * | 11/1998 | Colgan et al. .............. 349/156 |
| 5,963,288 A | * | 10/1999 | Sato et al. .................. 349/154 |
| 6,104,457 A | * | 8/2000 | Izumi et al. .................... 349/73 |
| 6,197,209 B1 | | 3/2001 | Shin et al. |
| 6,219,126 B1 | * | 4/2001 | Von Gutfeld ............... 349/153 |
| 6,304,308 B1 | * | 10/2001 | Saito et al. ................. 349/155 |
| 6,357,763 B2 | * | 3/2002 | Mathew et al. ............. 277/628 |
| 6,384,882 B1 | * | 5/2002 | Nagayama et al. ......... 349/110 |
| 6,400,439 B1 | * | 6/2002 | Fujioka et al. ............. 349/153 |
| 6,778,248 B1 | * | 8/2004 | Ootaguro et al. ........... 349/153 |

FOREIGN PATENT DOCUMENTS

JP 06175141 * 6/1994

* cited by examiner

*Primary Examiner*—Toan Ton
(74) *Attorney, Agent, or Firm*—Rabin & Berdo, PC

(57) ABSTRACT

A panel with a blocker comprising: an upper plate, a lower plate opposite to said upper plate, a liquid crystal layer, with which a gap between the upper plate and lower plate is filled, a blocker formed on the edge of said lower plate; and a sealant formed next to said blocker, wherein the blocker separates the sealant from the liquid crystal layer. The panel of the present invention can be a LCD panel or a LCOS panel.

28 Claims, 4 Drawing Sheets ial No. 90114488, filed on Jun. 14, 2001.

SEALANT ENCASED BLOCKER FOR LCD OR LCOS PANEL

This application incorporates by reference of Taiwan application Serial No. 90114488, filed on Jun. 14, 2001.

BACKGROUND OF THE INVENTION

1. Field of the Invention

The invention relates in general to a panel, and more particularly to a panel with a sealant blocker.

2. Description of the Related Art

Due to the high popularity of portable products, e.g., personal digital assistant (PDA) and cellularphone, the display technology develops rapidly. By employing a silicon plate, a glass plate, and liquid crystal molecules, a LCOS (liquid crystal on silicon) panel is more compact and has higher resolution than the traditional liquid crystal display (LCD), in which liquid crystal molecules are filled between two glass plates.

FIG. 1 is a cross section of a single pixel on a reflective-type LCOS. The LCOS has a lower plate 102 and an upper plate 101. The lower plate 102 includes a silicon substrate 103, and further includes a thin film transistor (TFT) 106, a capacitor 108, a pixel electrode 110, scan lines 107, data lines 111, and a reflective layer 112 on the silicon substrate 103, wherein the scan lines 107 are parallel to each other and so are the data lines 111. The upper plate 101 includes a glass substrate 120 and an opaque electrode 118, such as ITO electrode, on the glass substrate 120.

The upper plate 101 and the lower plate 102 are opposite to each other, and the gap between the two plates is filled with liquid crystal molecules. The liquid crystal molecules with spacers 132 constitutes a liquid crystal layer 114. A sealant 130 is next to the liquid crystal layer 114. The sealant 130 is used to connect the upper plate 101 and the lower plate 102, and the spacer 132 is used to support the spacing of the gap. The spacer 132 can be formed by direct spraying. To distinguish photo spacers from the other spacers, the photo spacers are labeled as 132(2), and the other spacers are labeled as 132(1).

The driving circuit of LCOS applies a voltage signal to the pixel electrode 110 to control the operations of each pixel by enabling scan lines 107 and data lines 111. The polarization of the light passing through the liquid crystal layer 114 is modulated by the alignment of the liquid crystal molecules in the liquid crystal layer 114, which varies with the voltage applied to the pixel electrode 110. After the incident ray (labeled as I in FIG. 1) passes through the liquid crystal layer 114, the reflected ray (labeled as O in FIG. 1) is produced by the reflective layer 112 and passes through a polarizing film (not shown in FIG. 1). The polarized reflected ray O has the brightness corresponding to the voltage applied to the pixel electrode 110.

Another method to form a uniform gap, which is more commonly used now a days, is to apply a long-shaped photo spacer in the spacing between the pixels. Referring to FIG. 2, it shows a cross-sectional view of LCOS with long-shaped photo spacer 205 before the upper plate 201 and the lower plate 202 are compressed. The manufacturing of the upper plate 201 and the lower plate 202 are completed respectively. The lower plate 202 has the long-shaped photo spacers 205, extending upwardly and including an optical fiber therein. Then, a sealant 203 is also formed on the periphery of the lower plate 202. The upper plate 201 and the lower plate 202 are aligned to each other and are compressed towards each other. After the compressing of the upper plate 201 and the lower plate 202, the width of the gap can be sustained to be uniform by the long-shaped photo spacer 205.

Referring to FIG. 3, it shows a LCOS with the liquid crystal molecules filled in cell room 304 of each pixel. The cell room 304 is the spacing separated by the long-shaped photo spacer 305. After the compressing, liquid crystal molecules are injected into the cell rooms 304 and the manufacturing of the LCOS is completed.

However, the sealant utilized in FIG. 2 and FIG. 3 will contaminate the liquid crystal molecules in the peripheral cell room 304(1), which is disposed on the edge of the lower plate 302. And the polluted and un-polluted liquid crystal molecules will have different alignments, although the voltage signals applied to the pixel electrodes are the same. Therefore, the display quality on the panel edge is not consistent with the other area of the panel.

Furthermore, a hot pressing process is needed to cure the sealant to seal the upper plate and the lower plate tightly. The high temperature of the hot pressing process on the devices of the upper plate and the lower plate, and shortens the panel lifetime.

Moreover, the structure of the LCOS is easily destroyed by the hot pressing process due to the different coefficient of expansion for the sealant, upper plate, and lower plate. So that the residual stress will decrease the yield of the LCOS.

Also, a UV gel, which is a substitute of the sealant 303, is cured by irradiating UV light and does not have the disadvantages caused by the hot pressing process. However, the liquid crystal molecules are polluted more seriously by the UV gel than by the sealant, which limits the using of the UV gel in the traditional method.

SUMMARY OF THE INVENTION

It is therefore an object of the invention to provide a panel without the issues of sealant pollution, residual stress, and lifetime shortening. The present invention provides a panel with a blocker and the panel comprises an upper plate, a lower plate, and a liquid crystal layer. The lower plate is opposite to the upper plate, and the blocker is formed on the edge of the lower plate, wherein a sealant is formed in the blocker. The liquid crystal layers, with which a gap between the upper plate and lower plate is filled, are separated from the sealant by the blocker.

The blocker comprises a blocking plate positioned between the sealant and the liquid crystal layer. Another embodiment comprises an inner blocking plate and an outer blocking plate, wherein the sealant is positioned between the outer blocking plate and the inner blocking plate. The panel of the present invention can be a LCD or a LCOS panel.

Other objects, features, and advantages of the invention will become apparent from the following detailed description of the preferred but non-limiting embodiments. The following description is made with reference to the accompanying drawings.

DETAILED DESCRIPTION OF THE INVENTION

The technical feature of the invention is the application of a blocker on the lower plate to prevent the contamination of the liquid crystal molecules by the sealant in the manufacturing processes of liquid crystal on silicon (LCOS).

Figure 1:
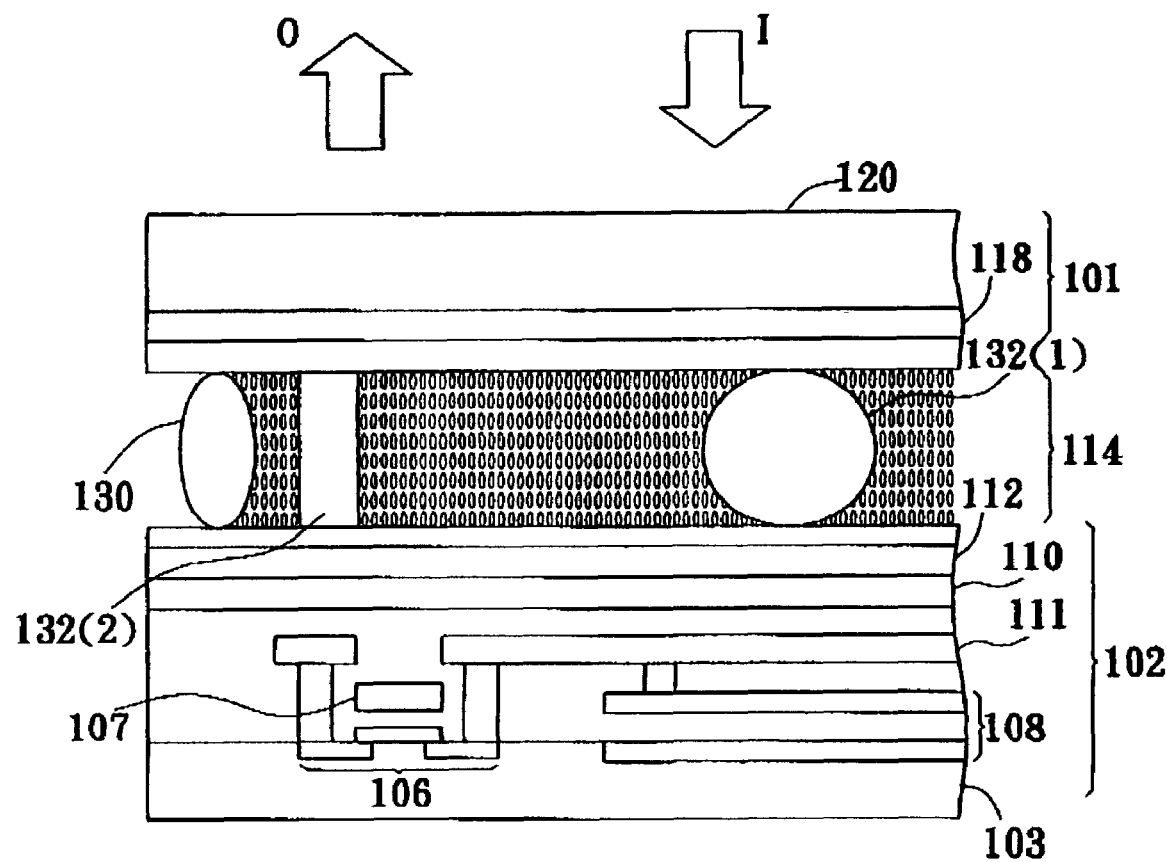
FIG. 1 shows a single pixel on a reflective-type LCOS in a cross-sectional view according to a traditional method.
Figure 2:
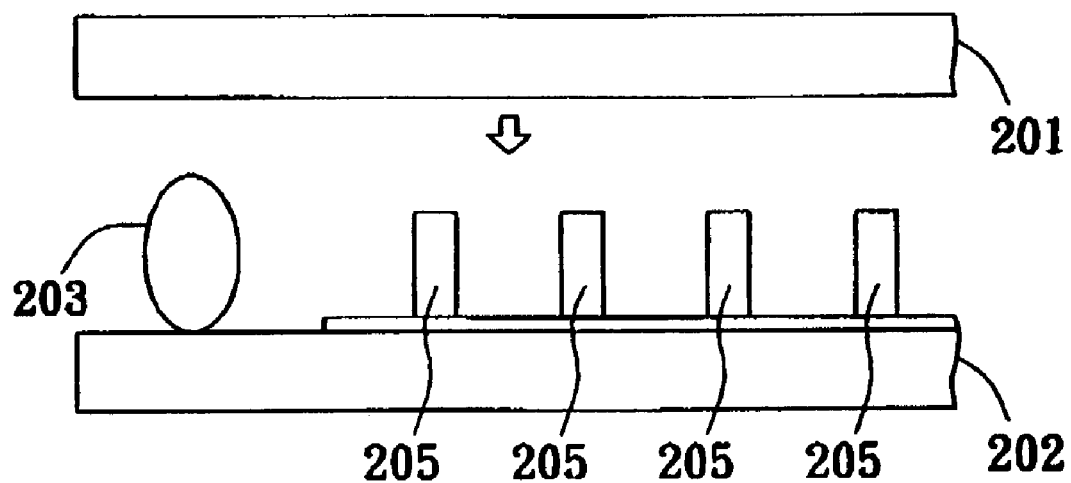
FIG. 2 shows a cross-sectional view of LCOS with long-shaped photo spacer before the upper plate and the lower plate are compressed by another traditional method.
Figure 3:
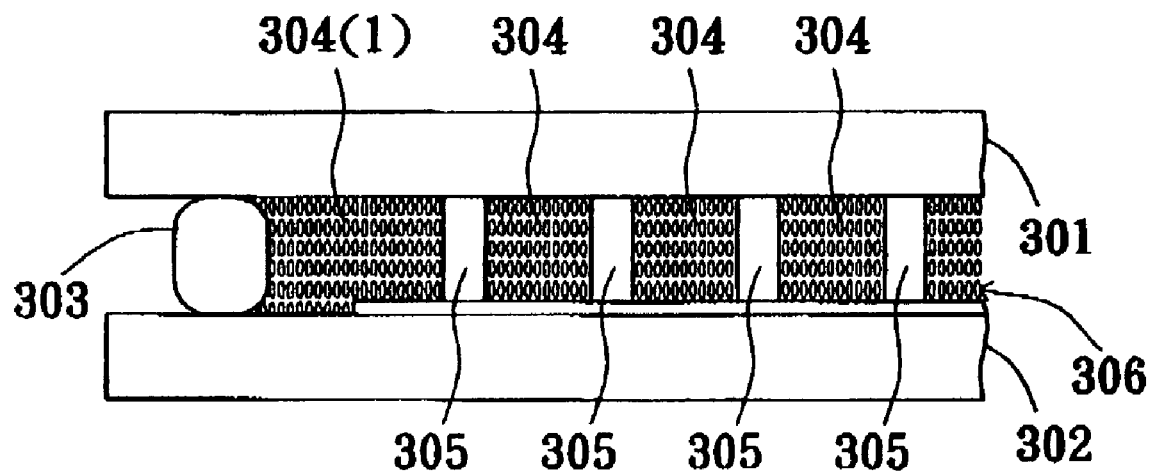
FIG. 3 shows a LCOS with the liquid crystal molecules filled in cell rooms according to another traditional method.
Figure 4A:
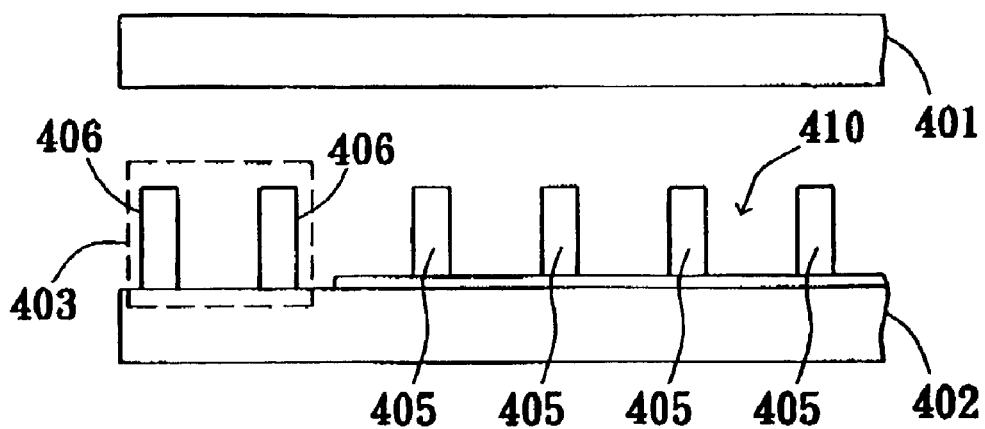
FIG. 4A shows that a blocker is applied before the formation of a sealant according to a preferred embodiment of the present invention.

Referring to FIG. 4A, it shows that a blocker is applied before the formation of a sealant according to a preferred embodiment of the present invention. The blocker 403 comprises two blocking plates 406. The blocker 403 is positioned on the periphery of the lower plate 402, and photo spacers 405 are positioned on the other area of the lower plate 402. The blocker 403 and photo spacers 405 can be formed on the lower plate 402 concurrently. The cell rooms 410 are the spacing separated by the photo spacers 405. A trench is formed between the two blocking plates 403. The blocker 403 and the photo spacers 405 are formed within the same photo step of semiconductor manufacturing.

Figure 4B:
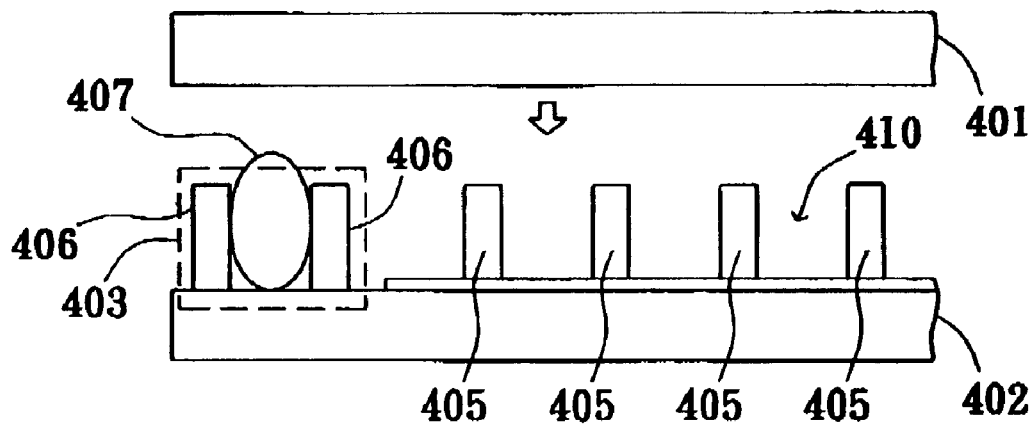
FIG. 4B shows that a sealant is formed on the lower plate according to a preferred embodiment of the present invention.

Referring to FIG. 4B, it shows that a sealant is formed on the lower plate 402 according to a preferred embodiment of the present invention. After the formation of photo spacers 406 and the blocker 403, a sealant 407 is coated between the two blocking plates 406. The two blocking plates 406 can support the sealant 407 and limit the sealant 407 within the trench. Then, the upper plate 401 and the lower plate 402 are aligned to each other and are compressed. Without the photo fiber applied in the traditional method, the blocking plates 406 of the present invention does not need adding the photo fiber into the sealant 407.

Figure 4C:
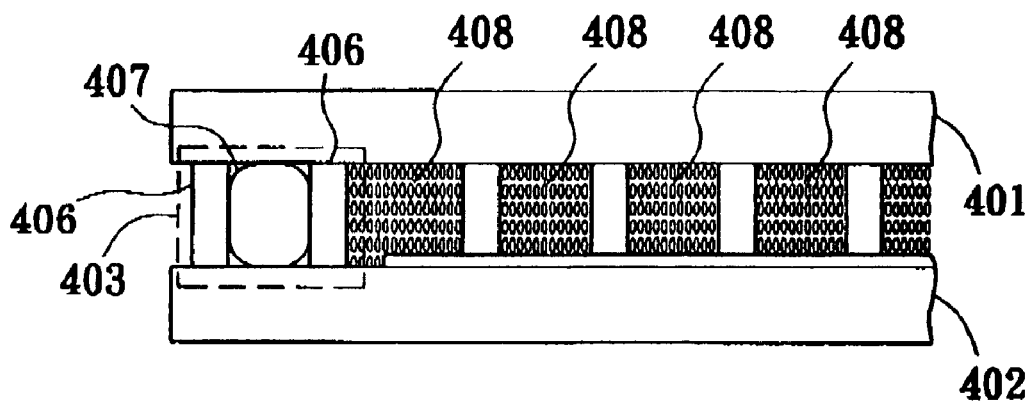
FIG. 4C shows that liquid crystal molecules are filled in the cell rooms according to a preferred embodiment of the present invention.

Referring to FIG. 4C, it shows that liquid crystal molecules 408 are filled in the cell rooms. After the upper plate 401 and the lower plate 402 are compressed, liquid crystal molecules 408 are filled in the cell rooms 410 of the pixels. The liquid crystal molecules 408 have no contact with the sealant 407 and will not be polluted by the sealant 407, which accordingly improves the image quality of the LCOS.

The sealant 407 of the present invention can be also a UV gel because the contamination issue is solved. Moreover, the application of UV gel also does not have the disadvantages of the device lifetime shortening and the residual stress as in the hot pressing process.

Figure 5A:
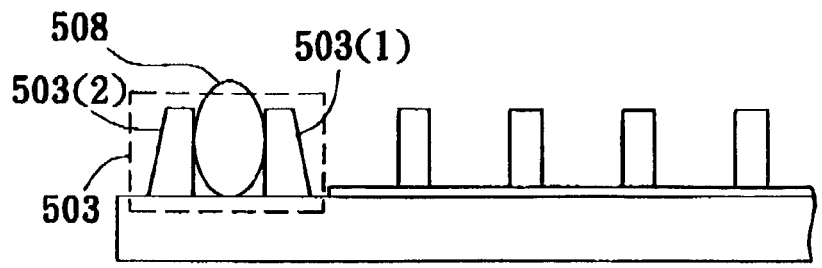
FIGS. 5A~5E show the various configurations of blocking plates.

Please referring to FIGS. 5A~5E, they show various configurations of the blocking plates. Besides the two blocking plates 406 of rectangle shape as in FIG. 4A, two blocking plates 503(1), 503(2) of trapezoidal shape shown in FIG. 5A are also applicable, wherein the blocking plate 503(1) is an inner blocking plate and the blocking plates 503(2) is an outer blocking plate.

Figure 5B:
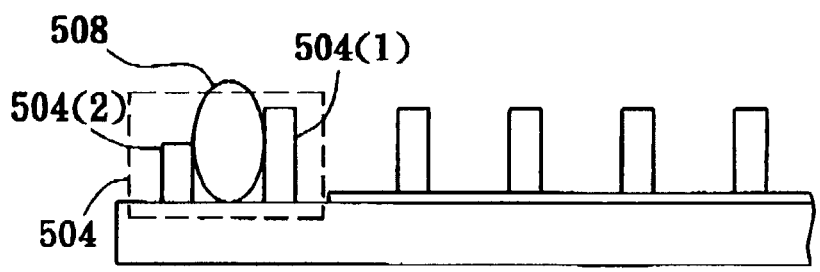
Figure 5C:
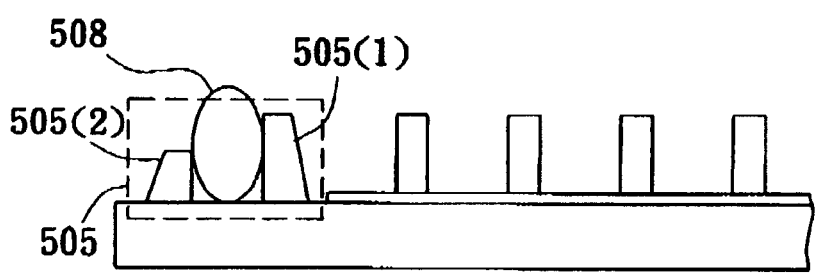

In FIG. 5B, the length of the outer blocking plate 504(2) is shorter than that of the inner blocking plate 504(1), wherein the inner blocking plate 504(1) separates the sealant 508 from the liquid crystal molecules, and the outer blocking plate 504(2) can allow the surplus sealant overflow when the upper plate and the lower plate are compressed together. The same structure is designed in FIG. 5C, except that the blocking plates 505(1), 505(2) are of trapezoidal shape.

Figure 5D:
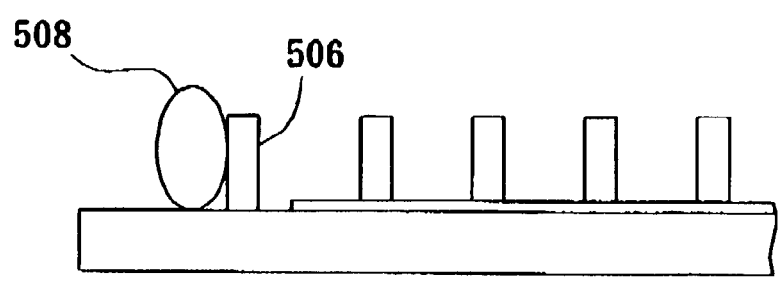
Figure 5E:
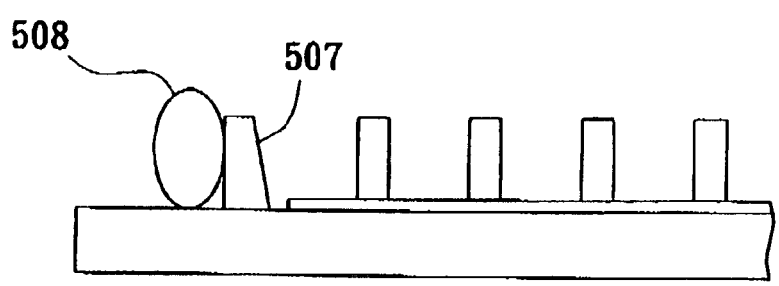

In FIG. 5D, the blocker has only one inner blocking plate 506 of rectangular shape, which separates the sealant 508 from the liquid crystal molecules, and also allows the surplus sealant overflow during the compressing of the upper plate and the lower plate. Similarly as in FIG. 5E, the inner blocking plate 507 can be of trapezoidal shape.

The photo spacer, blocker, and sealant can be formed as in general semiconductor process, and the blocker of the present invention is applicable in LCOS structure and other liquid crystal display (LCD) structure. The advantages are described as follows.

First, the problem that the liquid crystal molecules are contaminated by the sealant is prevented from the formation of the blocker. The blocker at least comprises a blocking plate positioned between the sealant and the pixel to block the contacting of sealant from the liquid crystal molecules.

Second, the process that a photo fiber is formed in the sealant is reduced and the process of forming a blocker does not need extra process steps, wherein the blocker has the function to support the sealant and is formed in the same process step when the photo spacer is formed. Therefore, no extra process cost is needed.

Third, the applicability of UV gel in the present invention solves the problems of lifetimes shortening and residual stress, which is caused by the hot pressing process. The UV gel is simply cured by irradiating a UV ray, which causes no heating reaction in the upper plate, lower plate and the devices. So, the yield of the display is increased.

While the invention has been described by way of examples and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A panel with a blocker, comprising:
an upper plate;
a lower plate opposite to said upper plate, wherein said blocker is formed along a periphery of said lower plate;
a sealant formed in said blocker, for connecting the upper plate and the lower plate, said sealant being free of photo fiber, said blocker serving to support said sealant, wherein said blocker includes an inner blocking plate and an outer blocking plate, said outer blocking plate has a smaller height than said inner blocking plate, and said sealant is positioned between said outer blocking plate and said inner blocking plate; and
a layer of liquid crystal molecules, filling a gap between said upper plate and said lower plate, said layer of liquid crystal molecules being separated from said sealant by said blocker.

2. The panel according to claim 1, further comprising a plurality of photo spacers positioned at an area other than the periphery of the lower plate, said photo spacers and said blocker both being formed of a same material that does not contaminate said liquid crystal molecules.

3. The panel according to claim 1, wherein said inner blocking plate is positioned between said sealant and said layer of liquid crystal molecules.

4. The panel according to claim 1, wherein said panel is a liquid crystal display (LCD) panel.

5. The panel according to claim 1, wherein said panel is a liquid crystal on silicon (LCOS) panel.

6. The panel according to claim 1, wherein said sealant surrounds the liquid crystal molecules.

7. The panel according to claim 1, wherein said sealant is a UV gel.

8. A panel comprising:
an upper plate;
a lower plate opposite to, and spaced by a gap from said upper plate;
a blocker formed along a periphery of said lower plate, wherein said blocker includes an inner blocking plate and an outer blocking plate, and said outer blocking plate has a smaller height than said inner blocking plate;
a sealant formed in said blocker and positioned between said outer blocking plate and said inner blocking plate, for connecting the upper plate and the lower plate, said sealant being free of photo fiber, said blocker serving to support said sealant; and
a plurality of liquid crystal molecules filing the gap between said upper plate and said lower plate, said plurality of liquid crystal molecules being separated from said sealant by said blocker.

9. The panel according to claim 8, further comprising a plurality of photo spacers positioned at an area other than the periphery of the lower plate, said photo spacers and said blocker both being formed of a same material that does not contaminate said liquid crystal molecules.

10. The panel according to claim 8, wherein said inner blocking plate is positioned between said sealant and said liquid crystal molecules.

11. The panel according to claim 8, wherein said panel is a liquid crystal display (LCD) panel.

12. The panel according to claim 8, wherein said panel is a liquid crystal on silicon (LCOS) panel.

13. The panel according to claim 8, wherein said sealant surrounds the liquid crystal molecules.

14. The panel according to claim 8, wherein said sealant is a UV gel.

15. A panel, comprising:
an upper plate;
a lower plate opposite to said upper plate, wherein said upper plate and said lower plate are connected by a sealant;
liquid crystal molecules deposited in a gap between said upper plate and said lower plate, said sealant bonding to the upper and lower plates so as to hold them in a fixed spatial relation; and
a blocker formed in said gap, said blocker including an inner blocking plate and an outer blocking plate, said sealant positioned between said inner blocking plate and said outer blocking plate, and said inner blocking plate separating said liquid crystal molecules and said sealant so as to prevent said liquid crystal molecules from being contaminated by said sealant;
wherein said outer blocking plate has a smaller height than said inner blocking plate, whereby the panel contains no excess sealant between the inner and outer blocking plates.

16. The panel according to claim 15, wherein said liquid crystal molecules are surrounded by said blocker.

17. The panel according to claim 15, wherein said inner blocking plate and said outer blocking plate are rectangle-shaped or trapezoid-shaped.

18. The panel according to claim 15, wherein said panel is a liquid crystal display (LCD) panel or a liquid crystal on silicon (LCOS) panel.

19. The panel according to claim 15, wherein said sealant is a UV gel.

20. The panel according to claim 16, wherein said sealant surrounds the liquid crystal molecules, and said outer blocking plate surrounds said sealant, said inner blocking plate and said liquid crystal molecules.

21. The panel according to claim 15, wherein said sealant is free of photo fiber, said blocker serving to support said sealant.

22. The panel according to claim 15, further comprising a plurality of photo spacers positioned at an area other than the periphery of the lower plate, said photo spacers and said blocker both being formed of a same material that does not contaminate said liquid crystal molecules.

23. A panel, comprising:
an upper plate;
a lower plate opposite to said upper plate;
a blocker formed along a periphery of said lower plate, wherein said blocker includes two blocking plates forming a trench therebetween;
a sealant formed in said blocker and directly adhered to said upper plate and said lower plate, said blocking plates limiting said sealant within said trench; and
a layer of liquid crystal molecules, filling a gap between said upper plate and said lower plate, said layer of liquid crystal molecules being separated from said sealant by said blocker.

24. The panel according to claim 23, wherein said sealant surrounds the liquid crystal molecules.

25. The panel according to claim 23, wherein said sealant is a UV gel.

26. The panel according to claim 23 further comprising a plurality of photo spacers positioned at an area other than the periphery of the lower plate, said photo spacers and said blocker both being formed of a same material that does not contaminate said liquid crystal molecules.

27. The panel according to claim 23, wherein said panel is a liquid crystal display (LCD) panel or a liquid crystal on silicon (LCOS) panel.

28. The panel according to claim 23, wherein said sealant is a gel.

* * * * *